Feb. 21, 1956 A. S. BRENNER 2,735,355
FRYING DEVICE FOR DOUGHNUTS
Filed Feb. 17, 1953 3 Sheets-Sheet 1
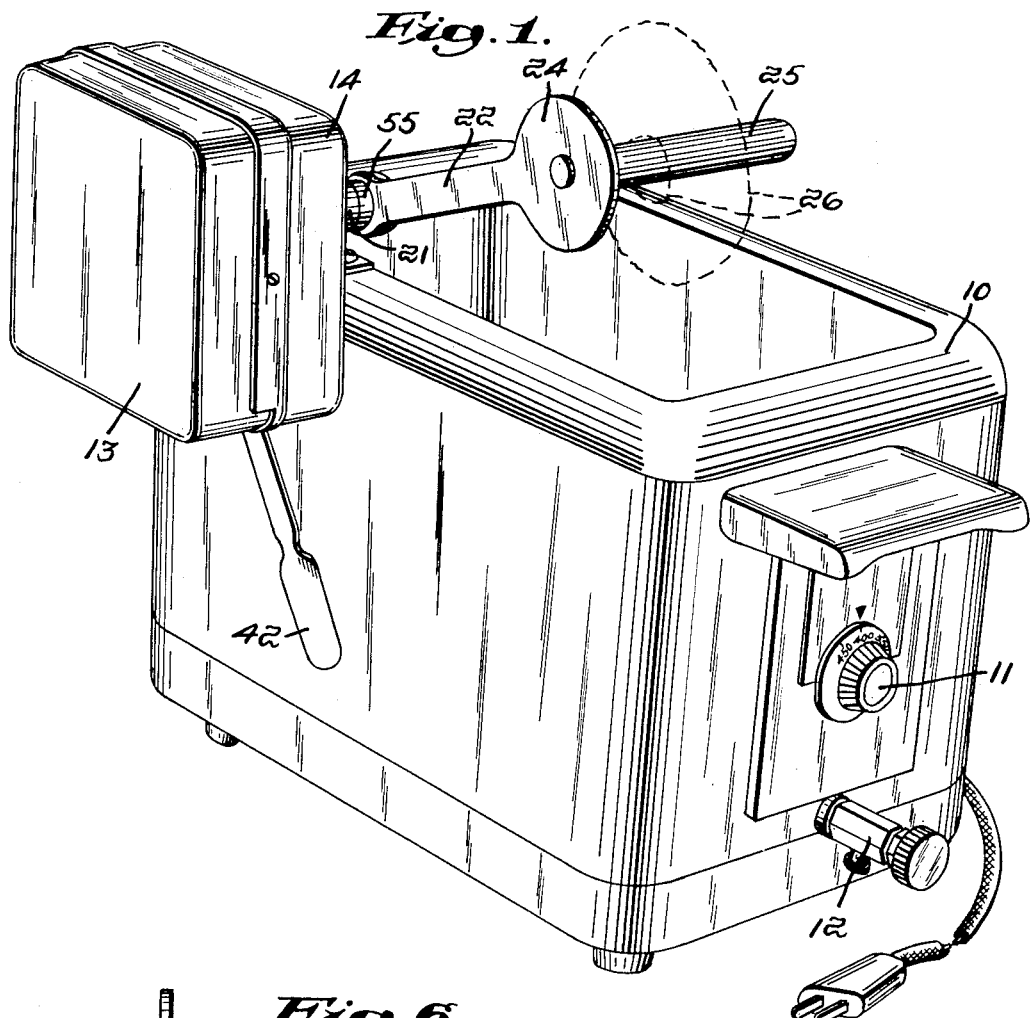
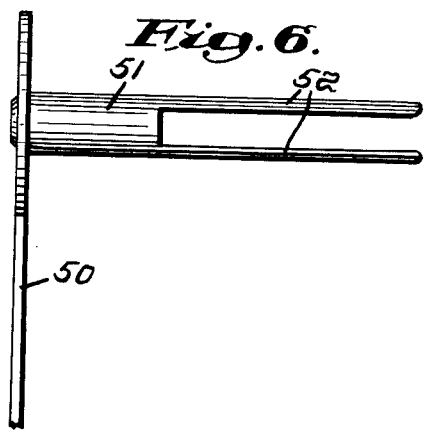
Inventor:
Alexander S. Brenner,
by Thomson & Thomson
Attorneys Feb. 21, 1956  A. S. BRENNER  2,735,355
FRYING DEVICE FOR DOUGHNUTS
Filed Feb. 17, 1953  3 Sheets-Sheet 2
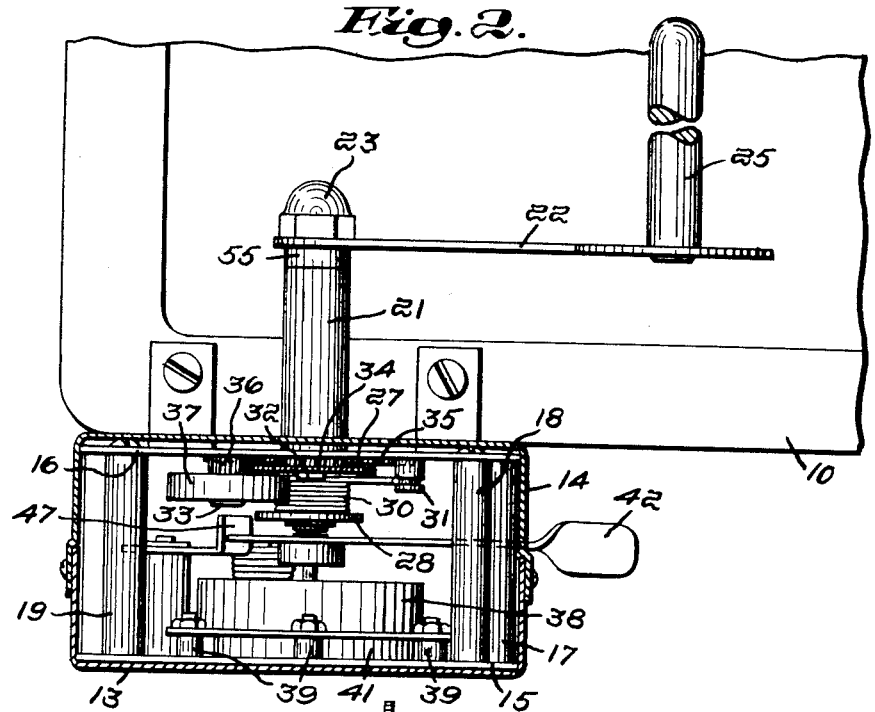
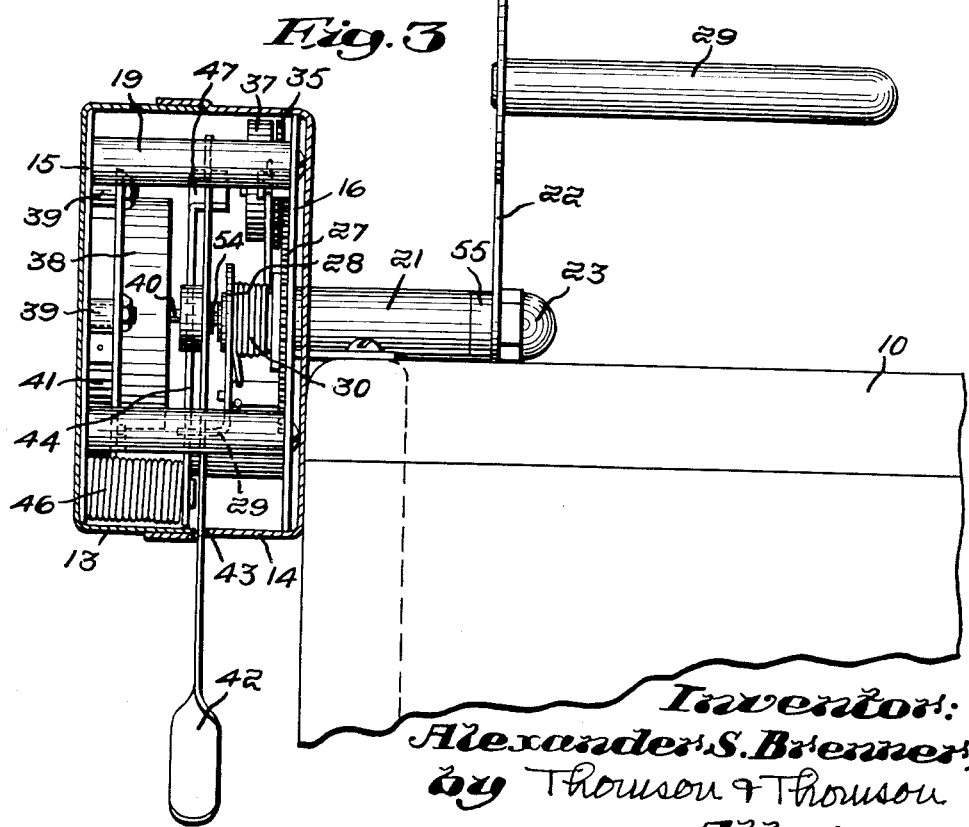
Inventor:
Alexander S. Brenner,
by Thomson & Thomson
Attorneys Feb. 21, 1956   A. S. BRENNER   2,735,355
FRYING DEVICE FOR DOUGHNUTS
Filed Feb. 17, 1953   3 Sheets-Sheet 3
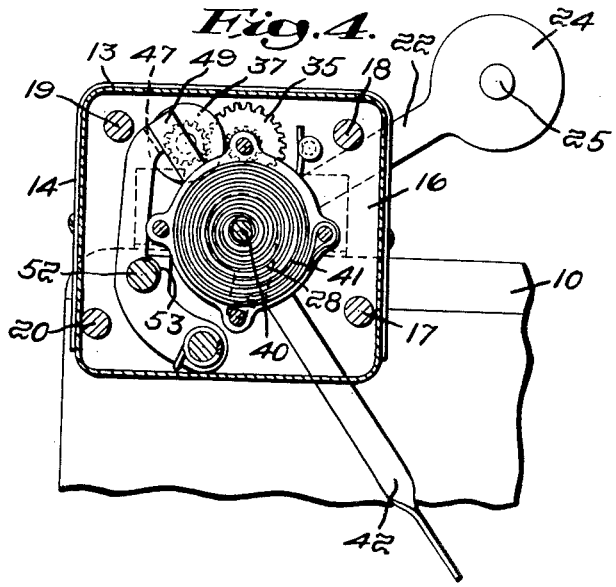
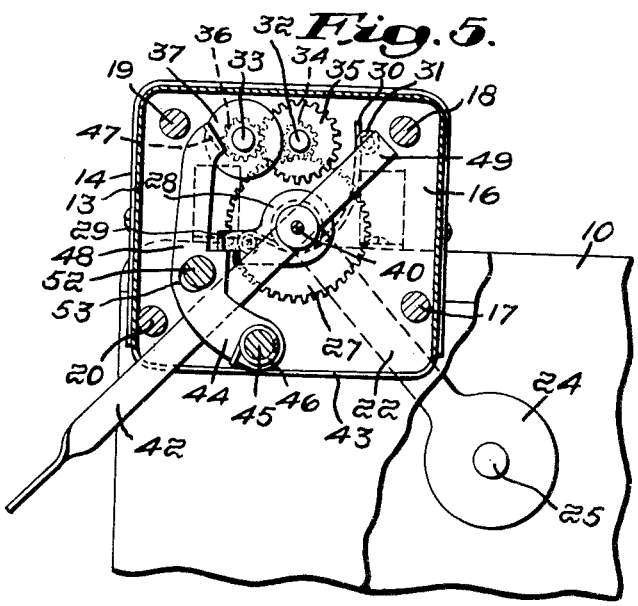
Inventor:
Alexander S. Brenner,
by Thomson & Thomson
Attorneys

United States Patent Office

2,735,355
Patented Feb. 21, 1956

2,735,355

FRYING DEVICE FOR DOUGHNUTS

Alexander S. Brenner, Chelsea, Mass., assignor to Donuts Inc., Boston, Mass., a corporation of Massachusetts Application February 17, 1953, Serial No. 337,311

3 Claims. (Cl. 99—336)

This invention relates to a frying device suitable for automatically frying small quantities of food, and particularly adapted for frying doughnuts.

The automatic doughnut frying machines now in use are relatively cumbersome and expensive and are employed mainly for large volume production. In these machines, the doughnuts are surface fried on one side while floating on the fat and then turned over and cooked on the other side. The turning operation requires a fairly complicated and accurately adjusted mechanism. The machines also require a large quantity of fat, take considerable time to heat up, and have a number of plicated parts to dismantle and clean. While it is well known that freshly fried doughnuts are considerably more appetizing than those which have been kept for any length of time, restaurants, diners, drugstores and other eating places which have a relatively small or intermittent demand, have found it impractical to maintain a doughnut frying machine of the conventional type, and therefore have been in the custom of purchasing fried doughnuts from a manufacturer. Since it is necessary to keep on hand enough for the maximum anticipated demand, and the doughnuts are at least a day old when received, the percentage of stale doughnuts is relatively high.

The object of this invention is to provide a machine for frying doughnuts in small quantities which is sufficiently small and inexpensive for restaurants and eating places which require a minimum of maintenance and attention, which fries doughnuts uniformly and evenly, and removes them automatically when done, which uses a small quantity of fat, which has only a few simple parts to clean, and which can be put into operation very rapidly. The machine here disclosed has a very simple mechanism for holding the doughnuts submerged in the fat so the entire doughnut is fried at once. This method of frying not only eliminates the turning operation, but has further advantages in that the doughnuts are more evenly fried and absorb less fat, and the frying time is reduced approximately half.

The machine here disclosed makes it possible for a small diner or restaurant operator to buy pre-formed or frozen doughnuts in relatively large quantities and fry a few at a time as needed. The doughnuts may be stored in a refrigerator, and will keep fresh for a long time, so that a quantity sufficient to meet the maximum demand may be kept on hand, but there is no spoilage on days when the demand is small. Furthermore, the machine operates so rapidly that the doughnuts can be cooked to order for each customer, thus insuring a hot, fresh product.

In the drawings illustrating the invention:

Fig. 1 is an isometric view of a doughnut frying machine constructed according to the invention, Fig. 2 is a plan view of the timing and holding mechanism, Fig. 3 is a front elevation of the timing and holding mechanism, Fig. 4 is a side elevation of the mechanism showing the food holding device in idle position, Fig. 5 is a side elevation showing the food holding device in position for frying, and Fig. 6 is a detail of an alternative form of holding device.

In Figs. 2 to 6 the housing of the timing mechanism is shown cut away for clarity.

The timing and food holding mechanism may be employed with any suitable container for deep fat frying, but is here shown, as in Fig. 1, mounted on a domestic electric deep well frying tank 10, which is generally rectangular in shape and deep enough so that a doughnut may be submerged upright. The temperature is controlled by means of a thermostatic switch 11, and the tank may be provided with a drain valve 12.

Mounted on the side of the tank is a housing consisting of two sections 13 and 14, which encloses the timing mechanism. As shown in Figs. 2, 3, 4 and 5, the housing encloses two plates 15 and 16, separated by spacer studs 17, 18, 19, and 20, which are permanently attached to plate 15 and connected to plate 16 by screws. Journalled in plate 16 is a shaft 21. An arm 22 is attached to the outer end of the shaft by means of a nut 23. An asbestos washer 55 may be placed between the arm and the main part of the shaft to cut down the heat transfer to the timing device. The free end of the arm is enlarged to form a circular baffle 24 to which is attached a finger 25. The finger is of about the diameter of the hole in a conventional doughnut, and one or more doughnuts may be slid over the free end and held in position by the finger as indicated by the dotted lines 26 in Fig. 1. The shaft 21 is connected to a gear 27, and has a reduced inner end to which is attached a latch arm 28 having a projecting lug 29. Between gear 27 and arm 28 is a coil spring 30 which acts as the return spring for arm 22. One end of spring 30 is connected to arm 28, and the other end engages a pin 31 on base plate 16. The spring normally holds arm 22 in the idle position as shown in Fig. 4.

Two shafts, 32 and 33, are rotatably mounted on plate 16. Shaft 32 has attached a small gear 34 which meshes with gear 27, and a larger gear 35 which meshes with a small gear 36 attached to shaft 33. Also attached to shaft 33 is a flywheel 37. A casing 38, enclosing a conventional clock mechanism which is the automatic timing element, is mounted on spacer studs 39 attached to plate 15. The clock mechanism has a shaft 40 to which is attached a main spring 41. On the inner end of shaft 40 is mounted a handle which projects through a slot 43 in the bottom of housing section 14. The handle may have a central plate 54 which bears on the end of shaft 21, but is not connected to it. A latch arm 44 is rotatably mounted on a pin 45 connected to plate 15 and is biased in the clockwise direction as viewed in Figs. 4 and 5 by means of a coil spring 46. Latch arm 44 has a lug 47 which projects into the plane of rotation of handle 42, as does lug 29 of latch arm 28. Latch arm 44 also has a shoulder 48 which engages lug 29 when arm 22 is in frying position, as shown in Fig. 5. A pin 52 mounted on plate 15 engages an elongated hole 53 in latch arm 44 to limit its motion and thus stop handle 42, and consequently arm 22, in the position shown in Fig. 4.

To operate the device, the doughnuts are slid over the end of finger 25, when arm 22 is in the idle position as shown in Fig. 4. Handle 42 is then rotated clockwise, and, by bearing on lug 29, carries latch member 28 with it, thus rotating arm 22 to the frying position as shown in Fig. 5. When lug 29 has travelled beyond shoulder 48, latch member 44 springs in and locks latch member 28 so as to hold arm 22 in the down position. Clockwise rotation of handle 42 also acts through shaft 40 to wind up mainspring 41. The clock mechanism enclosed in casing 38 starts to rotate handle 42 counterclockwise at a steady, predetermined rate. It is understood that this rate may be adjusted by means of a conventional speed regulating mechanism (not shown) operating in connection with the clock mechanism. Handle 42 continues to rotate until its upper extension 49 engages lug 47, pushing latch member 44 back and throwing shoulder 48 out of engagement with lug 29. Latch member 28 is then free to rotate counterclockwise under the force of return spring 30. The resulting rotation of shaft 21 carries arm 22 back to the idle position and also drives the gear and flywheel assembly, the function of which is to insure a complete return stroke of arm 22, and to smooth out the return motion so as to avoid spattering the fat as the doughnuts are lifted out. When arm 22 returns to the idle position, the fat drains off from the doughnuts quickly and completely and falls back into the tank. This method of drainage, as compared to laying the doughnuts on a flat surface, insures a dry and appetizing product and also results in a maximum economy of fat.

The correct frying period and temperature for the type of doughnuts used is usually determined by the supplier and the operation of the machine should ordinarily not be disturbed after the handle has been pulled back to start frying. If, for any reason, the operator desires to remove the doughnuts from the fat before the end of the timed period, handle 42 may be pushed counterclockwise, overriding the clock mechanism, to the position of Fig. 4, thus releasing latch member 28. The frying period may also be shortened for any single operation by rotating handle 42 part way back after locking latch member 28.

Fig. 6 illustrates a food holder which may be mounted on shaft 21 in place of arm 22 to adapt the machine for cooking such foods as crullers, meat or chicken. Arm 50 is a duplicate of arm 22 and carries a fork 51 having tines 52 on which the food can be speared.

In addition to the advantages previously discussed, it will be noted that the operating mechanism, except for arm 22 and finger 25, is completely enclosed, so that the number of parts which require cleaning is reduced to a minimum. The machine may also be put into operation very quickly because of the small amount of fat required and the consequent reduction in preheating time. The machine is not much larger than an electric toaster and may be placed on a counter or any convenient location for service to the customer.

What is claimed is:

1. A frying device for food such as doughnuts comprising: a frying tank of sufficient depth to allow the food to be submerged in fat contained therein; a horizontal shaft extending over said tank, a food carrying arm attached to said shaft and movable into and out of the tank; means for securing food to said arm, a latch member attached to one end of said shaft; a lever rotatively mounted alongside said latch member in a plane perpendicular to said shaft; a projection on said latch member extending into the plane of rotation of said lever, whereby manual rotation of the lever to a predetermined position rotates said shaft to bring said arm into a position in which the food is held completely submerged in the fat by said securing means; a second latch member having a shoulder adapted to engage said projection when said arm is in said position; a spring urging said second latch member into engagement with said projection; means for rotating said lever at a predetermined rate in the direction away from said projection; means operated by said lever on reaching a second predetermined position for disengaging said shoulder from said propection; and a spring adapted to return said arm to a position in which the food is above the level of the fat when said latch members are disengaged.

2. Apparatus according to claim 1 having a stop member acting on said second latch member to limit its motion when engaged by said lever and thereby stop said second latch member and said arm in the last mentioned position.

3. Apparatus according to claim 1 having a gear mounted on said shaft, a flywheel, and a gear train driven by said gear and adapted to drive said flywheel at a speed greater than that of the shaft.

References Cited in the file of this patent

UNITED STATES PATENTS

| | | |
|---|---|---|
| 1,161,618 | Coes | Nov. 23, 1915 |
| 1,485,253 | Devlin | Feb. 26, 1924 |
| 1,490,511 | Hermance | Apr. 15, 1924 |
| 1,993,609 | Kennedy | Mar. 5, 1935 |
| 2,165,204 | Anderson | July 11, 1939 |
| 2,243,953 | Graham | June 3, 1941 |
| 2,371,084 | Warner | Mar. 6, 1945 |
| 2,505,973 | Julian | May 2, 1950 |
| 2,548,680 | Olson et al. | Apr. 10, 1951 |
| 2,550,758 | Bemis | May 1, 1951 |
| 2,568,049 | Barrett | Sept. 18, 1951 |
| 2,595,283 | Mueller | May 6, 1952 |